(12) United States Patent
Zhang et al.

(10) Patent No.: US 11,418,097 B2
(45) Date of Patent: Aug. 16, 2022

(54) EXTERNAL WINDING CONTROLLED, TWO-DEGREE-OF-FREEDOM, BEARINGLESS, SWITCHED RELUCTANCE MOTOR

(71) Applicant: HUAIYIN INSTITUTE OF TECHNOLOGY, Huaian (CN)

(72) Inventors: Tao Zhang, Huaian (CN); Lihong Mo, Huaian (CN); Qing Lu, Huaian (CN); Weihong Ding, Huaian (CN); Zhongyi Tang, Huaian (CN); Yeqing Wang, Huaian (CN); Xing Xia, Huaian (CN)

(73) Assignee: HUAIYIN INSTITUTE OF TECHNOLOGY, Huaian (CN)

( * ) Notice: Subject to any disclaimer, the term of this patent is extended or adjusted under 35 U.S.C. 154(b) by 46 days.

(21) Appl. No.: 17/256,902

(22) PCT Filed: Jun. 14, 2019

(86) PCT No.: PCT/CN2019/091319
§ 371 (c)(1),
(2) Date: Dec. 29, 2020

(87) PCT Pub. No.: WO2020/001293
PCT Pub. Date: Jan. 2, 2020

(65) Prior Publication Data
US 2021/0376704 A1    Dec. 2, 2021

(30) Foreign Application Priority Data
Jun. 30, 2018    (CN) .......................... 201810715524.7

(51) Int. Cl.
*H02K 19/10*    (2006.01)
*H02K 3/12*    (2006.01)
(Continued)

(52) U.S. Cl.
CPC ............. *H02K 19/103* (2013.01); *H02K 3/12* (2013.01); *H02K 3/48* (2013.01); *H02K 3/487* (2013.01);
(Continued)

(58) Field of Classification Search
CPC .. H02K 3/00; H02K 3/04; H02K 3/12; H02K 3/46; H02K 3/47; H02K 3/48; H02K 3/487; H02K 19/00; H02K 19/10; H02K 19/103
(Continued)

(56) References Cited

U.S. PATENT DOCUMENTS 10,389,207 B2 *    8/2019    Schoeb ................... H02K 29/08
2017/0040868 A1    2/2017    Noh et al.
2021/0320575 A1 *    10/2021    Zhang .................. H02K 19/103

FOREIGN PATENT DOCUMENTS

CN    103683571 A    3/2014
CN    108809030 A    11/2018

OTHER PUBLICATIONS

Office Action issued in corresponding Chinese Application No. 201810715524.7, dated Sep. 29, 2019; 8 pgs.
(Continued)

*Primary Examiner* — Rashad H Johnson
(74) *Attorney, Agent, or Firm* — Hauptman Ham, LLP

(57) ABSTRACT

An external winding controlled two-degree-of-freedom bearing-free switched reluctance motor includes a stator and a rotor. An edge portion of the rotor includes rotor teeth. The stator includes an external winding and a stator core. The stator core includes four suspension teeth distributed in x and y directions on the same circumference of the radial outer side of the rotor and magnetism isolating bodies connected to two adjacent suspension teeth, each suspension tooth includes, along the axial direction of the rotor, a
(Continued)

permanent magnet sheet and magnetically conductive sheets symmetrically connected to two sides of the permanent magnet sheet, torque teeth are connected to the inner walls of the magnetism isolating bodies, and torque windings are wound around the torque teeth. The external winding includes x-direction control cores connecting two suspension teeth in the x direction to form two x-direction symmetrical closed paths.

3 Claims, 5 Drawing Sheets

(51) Int. Cl.
  *H02K 3/48* (2006.01)
  *H02K 3/487* (2006.01)
  *H02K 3/04* (2006.01)
  *H02K 3/47* (2006.01)
  *H02K 3/46* (2006.01)

(52) U.S. Cl.
  CPC ............... *H02K 3/04* (2013.01); *H02K 3/46* (2013.01); *H02K 3/47* (2013.01)

(58) Field of Classification Search
  USPC .................. 310/179–181, 184, 195–197
  See application file for complete search history.

(56) References Cited

OTHER PUBLICATIONS

First Search Report issued in corresponding Chinese Application No. 201810715524.7, dated Sep. 21, 2019; 1 pg (in English only).
International Search Report issued in corresponding International Application No. PCT/CN2019/091319; dated Sep. 3, 2019; State Intellectual Property Office of the P.R. China, Beijing, China, 5 pgs.
Written Opinion issued in corresponding International Application No. No. PCT/CN2019/091319; dated Sep. 3, 2019; State Intellectual Property Office of the P.R. China, Beijing, China, 14 pgs.

* cited by examiner

EXTERNAL WINDING CONTROLLED, TWO-DEGREE-OF-FREEDOM, BEARINGLESS, SWITCHED RELUCTANCE MOTOR

RELATED APPLICATIONS

The present application is a National Phase of International Application Number PCT/CN2019/091319 filed Jun. 14, 2019 and claims priority to Chinese Application Number 201810715524.7 filed Jun. 30, 2018.

TECHNICAL FIELD

The present invention relates to the technical field of bearing-free motor manufacturing, and in particular, to an external winding controlled two-degree-of-freedom bearing-free switched reluctance motor.

BACKGROUND

Bearing-free motors are a new type of high-speed special motors developed in the late 1980s. The bearing-free motors are mainly divided into three types: reluctance type bearing-free motors, induction type bearing-free motors, and bearing-free switched reluctance motors. Compared with the other two types, the bearing-free switched reluctance motor has no permanent magnets provided on a rotor, is simple in structure and high in rotor strength, overcomes the influence of a complex induced magnetic field of the rotor on suspension and rotation existing in the induction type bearing-free motor, and is a bearing-free motor with the most industrial application prospects.

For a conventional bearing-free switched reluctance motor, torque windings and suspension windings are together wound around stator teeth of the motor and are energized to generate a torque winding magnetic field and a suspension winding magnetic field, a stable and controllable radial suspension force can be generated only when the number of pole pairs $P_M$ of the torque winding magnetic field and the number of pole pairs $P_B$ of the suspension winding magnetic field necessarily satisfy a relationship of $P_M = P_B \pm 1$, torque is generated by the reluctance force formed by the torque winding magnetic field passing through stator and rotor teeth, and the suspension force is generated by the interaction of the suspension winding magnetic field and the torque winding magnetic field. Therefore, such a bearing-free switched reluctance motor has two shortcomings. First, the decoupling control between the suspension force and the torque is extremely complicated, and high-performance control algorithms are necessarily adopted to reflect the technical advantages thereof, but these algorithms are difficult or costly to implement in industry, which limits the industrial application process thereof. Second, the suspension windings occupy stator slot spaces of the torque windings, causing the torque of the bearing-free switched reluctance motor to be about half of that of a switched reluctance motor.

SUMMARY

The purpose of the present invention is to provide an external winding controlled two-degree-of-freedom bearing-free switched reluctance motor which has a compact structure, no coupling between suspension force and torque, and is capable of generating large torque and suspension force.

The present invention is implemented by means of the following technical solutions:

An external winding controlled two-degree-of-freedom bearing-free switched reluctance motor includes a stator and a rotor, an edge portion of the rotor being provided with rotor teeth, where: the stator consists of an external winding, torque windings, magnetism isolating bodies, torque teeth, suspension teeth, control cores, and a stator core; the stator core includes four suspension teeth distributed in x and y directions on the same circumference of the radial outer side of the rotor and magnetism isolating bodies connected to two adjacent suspension teeth, the magnetism isolating bodies are aligned with the outer sides of the suspension teeth, each suspension tooth is formed by stacking, along the axial direction of the rotor, a permanent magnet sheet and magnetically conductive sheets symmetrically connected to two sides of the permanent magnet sheet, torque teeth are connected to the inner walls of the magnetism isolating bodies, the suspension teeth and the torque teeth are disposed spaced from the rotor teeth to form a radial working air gap, and torque windings are wound around the torque teeth; the external winding includes x-direction control cores connecting two suspension teeth in the x direction to form two x-direction symmetrical closed paths, and y-direction control cores connecting two suspension teeth in the y direction to form two y-direction symmetrical closed paths, and suspension windings are respectively wound around the x-direction control cores and the y-direction control cores.

A further solution of the present invention is that the tooth width of the suspension teeth is greater than that of the torque teeth, and the tooth width of the suspension teeth is greater than one pole pitch of the motor.

A further solution of the present invention is that the suspension windings and the torque windings are all centralized windings, and the torque windings are divided to form a multi-phase structure.

The advantages of the present invention compared with the prior art are:

four suspension teeth are provided at corresponding positions of the stator core in the x and y directions and torque teeth are uniformly provided at other positions, the torque teeth are connected to the suspension teeth by means of a magnetism isolating material, centralized torque windings are wound around the torque teeth, the suspension tooth is formed by stacking, along the axial direction of the rotor, a permanent magnet sheet and magnetically conductive sheets symmetrically connected to two sides of the permanent magnet sheet, bias magnetic fluxes generated by the permanent magnet sheets passes through the magnetically conductive sheets, the radial working air gap, and the rotor to form a closed path, suspension control magnetic fluxes generated by the energization of the suspension windings respectively adjust the bias magnetic fluxes to enable the magnetic field on the side of the air gap to be enhanced and the magnetic field in the opposite direction to be weakened so as to generate a suspension force pointing to the direction of magnetic field enhancement, and a displacement sensor is mounted to establish a radial displacement closed-loop control system so as to implement stable suspension of the rotor with two degrees of freedom in the radial direction; the torque teeth are connected to the stator core of the motor by means of a magnetism isolating material, the torque winding magnetic field and the suspension winding magnetic field pass through different magnetic circuits to form closed paths, the number of pole pairs $P_M$ of the torque winding magnetic field and the number of pole pairs $P_B$ of the suspension winding magnetic field do not need to satisfy a relationship of $P_M=P_B\pm 1$, and the motor has no coupling between the torque and the suspension force and is simple to control and easy to implement; the suspension windings do not occupy the radial space of the motor, more torque windings can be wound, and the motor can generate large torque and power output.

DETAILED DESCRIPTION

Figure 1:
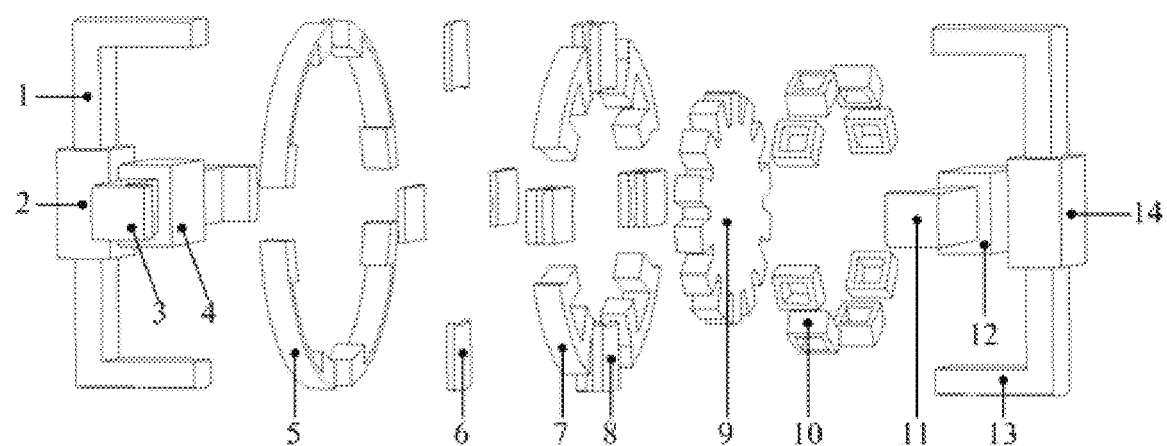
FIG. 1 is an axial schematic structural diagram of the present invention.

An external winding controlled two-degree-of-freedom bearing-free switched reluctance motor as shown in FIGS. 1 to 5 includes a stator and a rotor 9, where an edge portion of the rotor 9 is uniformly provided with 14 rotor teeth.

The stator consists of an external winding, torque windings, magnetism isolating bodies, torque teeth, suspension teeth, control cores, and a stator core; the stator core includes four suspension teeth distributed in x and y directions on the same circumference of the radial outer side of the rotor 9 and arc-shaped magnetism isolating bodies 5 connected to two adjacent suspension teeth, and the thickness of the magnetism isolating body 5 is equal to that of the suspension tooth; each suspension tooth is formed by stacking, along the axial direction of the rotor 9, a permanent magnet sheet 6 and magnetically conductive sheets 8 symmetrically connected to two sides of the permanent magnet sheet 6, the inner wall of each magnetism isolating body 5 is provided with a slot, a base sheet is embedded into the slot, two torque teeth 7 extending in the radial direction of the rotor 9 are provided on the base sheet, the two torque teeth 7 are uniformly distributed between the two suspension teeth, and the torque teeth 7 and the base sheet are integrally formed; the tooth width of the suspension teeth is greater than that of the torque teeth 7 and the tooth width of the suspension teeth is greater than one pole pitch of the motor, the suspension teeth and the torque teeth 7 are disposed spaced from the rotor teeth to form a radial working air gap, and torque windings 10 are wound around the torque teeth 7, and the suspension windings and the torque windings (10) are all centralized windings, where the torque windings (10) are divided to form a two-phase structure; the external winding includes a left-side x-direction control core 3, a right-side x-direction control core 11, a left-side y-direction control core 1, and a right-side y-direction control core 13, and a left-side x-direction suspension winding 4, a right-side x-direction suspension winding 12, a left-side y-direction suspension winding 2, a right-side y-direction suspension winding 14 which are respectively wound around the left-side x-direction control core 3, a right-side x-direction control core 11, a left-side y-direction control core 1, and a right-side y-direction control core 13; end portions of the left-side x-direction control core 3 and the right-side x-direction control core 11 are respectively connected to left and right side surfaces of the two x-direction suspension teeth to form two x-direction symmetrical closed paths; and end portions of the left-side y-direction control core 1 and the right-side y-direction control core 13 are respectively connected to left and right side surfaces of the two y-direction suspension teeth to form two y-direction symmetrical closed paths.

Figure 2:
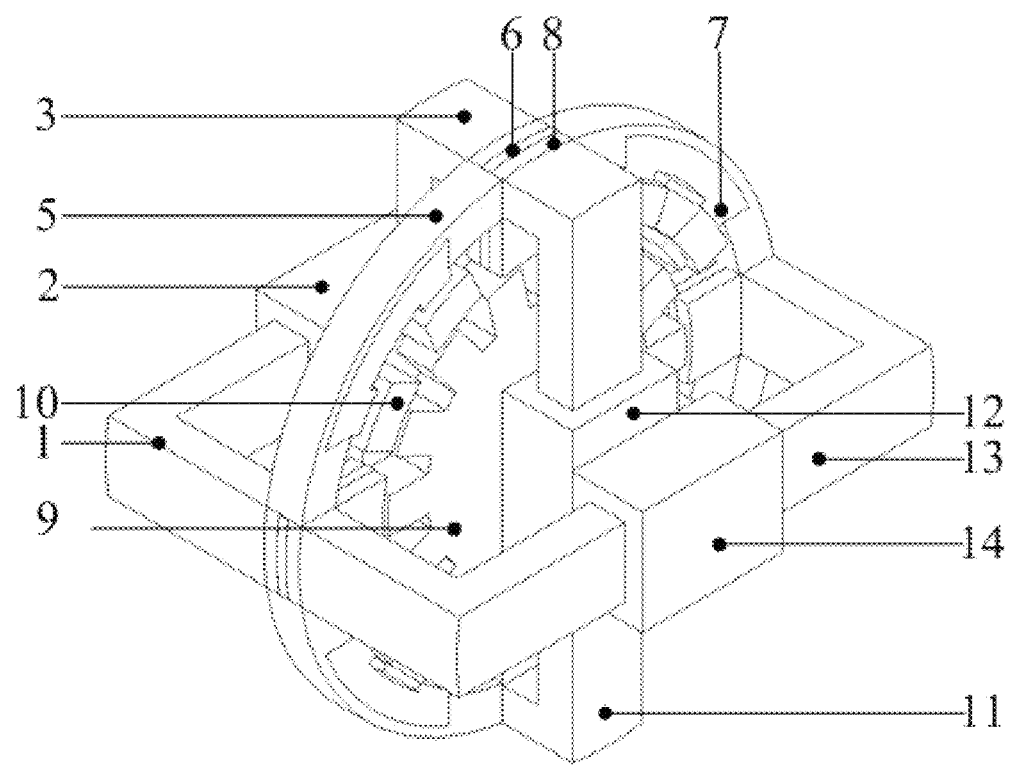
FIG. 2 is an oblique view of the present invention.
Figure 3:
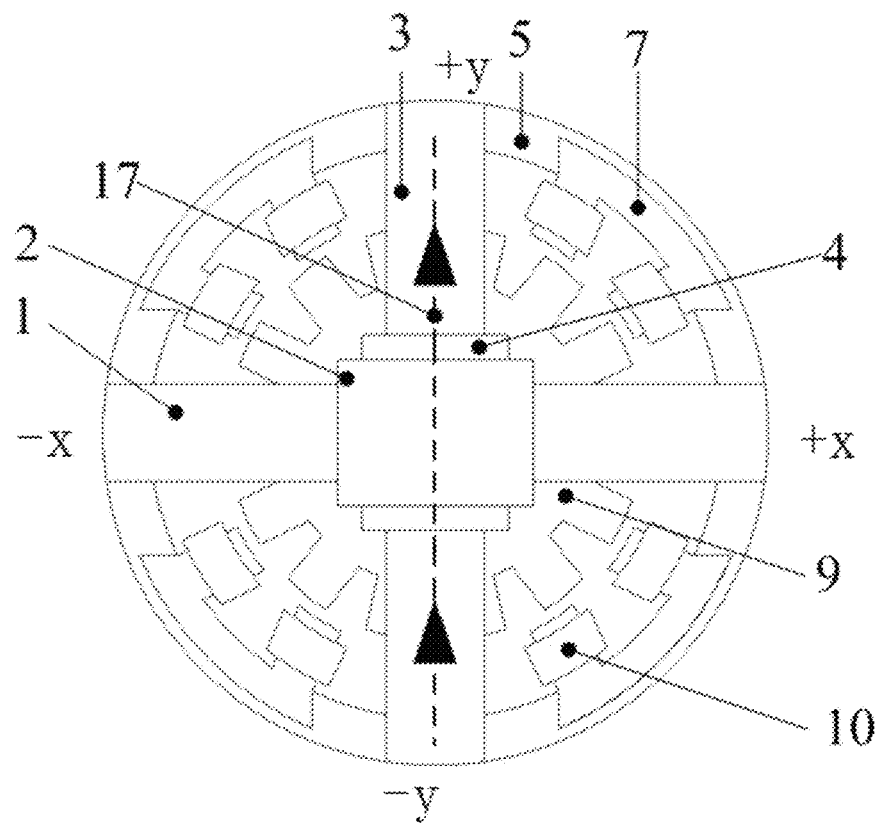
FIG. 3 is a left view of the present invention.
Figure 4:
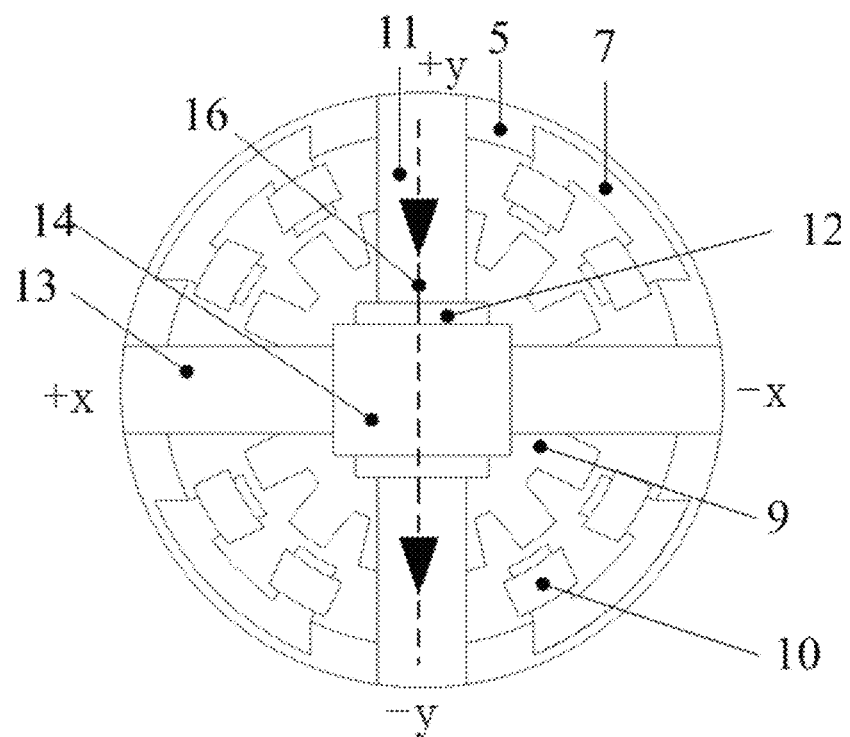
FIG. 4 is a right view of the present invention.
Figure 5:
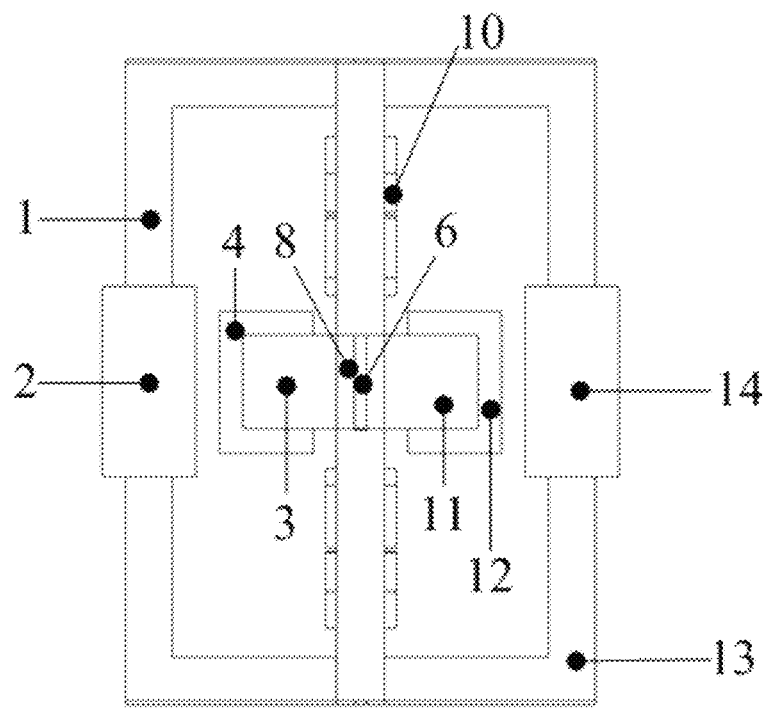
FIG. 5 is a front view of the present invention.

The left-side x-direction control core 3, the right-side x-direction control core 11, the left-side y-direction control core 1, the right-side y-direction control core 13, the left-side x-direction suspension winding 4, the right-side x-direction suspension winding 12, the left-side y-direction suspension winding 2, the right-side y-direction suspension winding 14, the suspension teeth, the torque teeth 7, the magnetism isolating bodies 5, the torque windings 10 in FIG. 2 are laminated.

The number of the rotor teeth and of the torque teeth 7 is adjustable.

Figure 6:
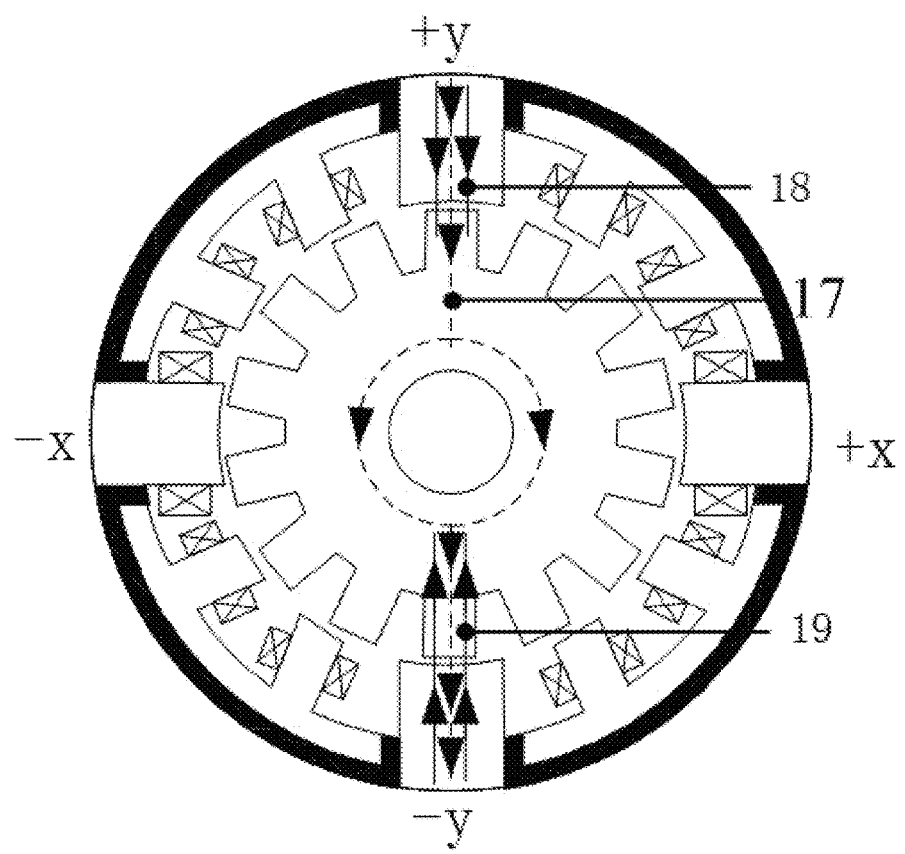
FIG. 6 is a left view of bias magnetic fluxes and suspension magnetic fluxes of stator and rotor cores of the present invention.
Figure 7:
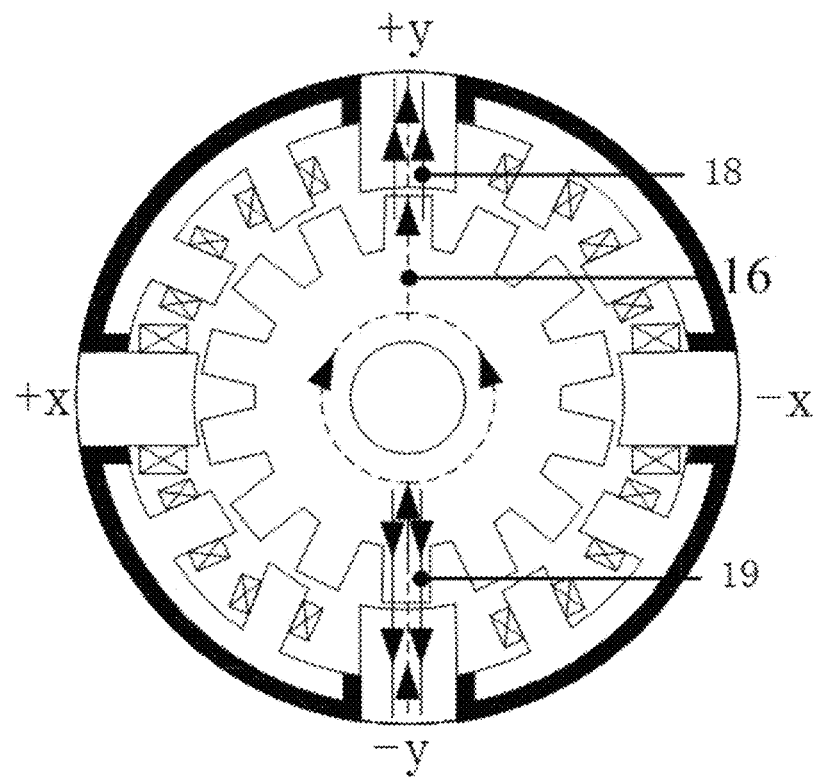
FIG. 7 is a right view of the bias magnetic fluxes and suspension magnetic fluxes of the stator and rotor cores of the present invention.
Figure 8:
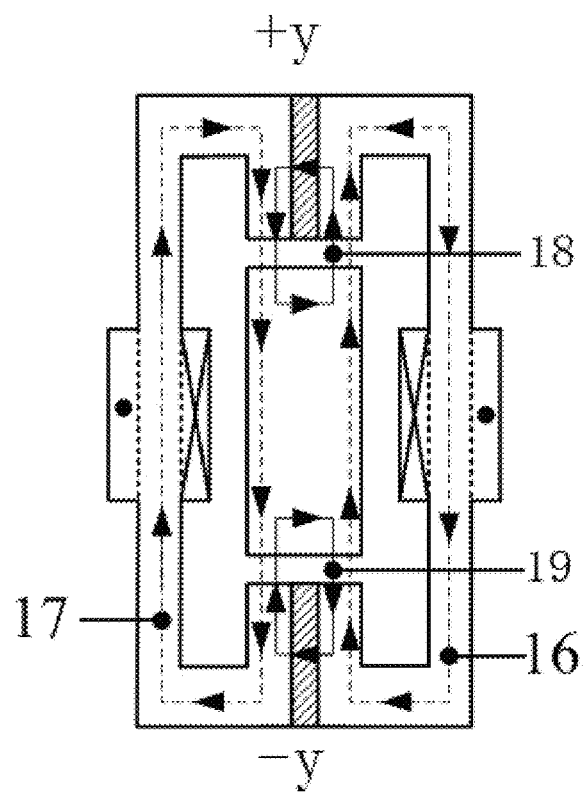
FIG. 8 is a sectional view of the present invention.

The principle of suspension is:

Taking the generation of a radial suspension force in a +y-direction as an example, as shown in FIGS. 6-8, the permanent magnet sheets 6 located in the +y-direction and a −y-direction respectively generate a +y-direction bias magnetic flux 18 and a −y-direction bias magnetic flux 19, where the +y-direction bias magnetic flux 18 starts from an N pole of the +y-direction permanent magnet sheet 6, passes through a +y-direction left-side magnetically conductive sheet 8, a left-side radial working air gap, and a right-side magnetically conductive sheet 8, and returns to an S pole of the +y-direction permanent magnet sheet 6 so as to form a closed path; the −y-direction bias magnetic flux 19 passes through a −y-direction left-side magnetically conductive sheet 8, the left-side radial working air gap, and a right-side magnetically conductive sheet 8 and returns to an S pole of the −y-direction permanent magnet sheet 6 so as to form a closed path.

The left-side y-direction suspension winding 2, the right-side y-direction suspension winding 14 are energized to respectively generate a left-side y-direction suspension control magnetic flux 17 and a right-side y-direction suspension control magnetic flux 16; the left-side y-direction suspension control magnetic flux 17 and the right-side y-direction suspension control magnetic flux 16 jointly adjust the +y-direction bias magnetic flux 18 and the −y-direction bias magnetic flux 19, so that the air gap magnetic field in the +y direction is superimposed and enhanced and the air gap magnetic field in the −y-direction is superimposed and weakened, so as to generate a suspension force pointing to the direction of air gap magnetic field enhancement, i.e., pointing to the +y direction. To generate a suspension force in the −y-direction, it is only necessary to reverse the current of the left-side y-direction suspension winding 2 and of the right-side y-direction suspension winding 14.

Suspension forces in the x-direction is generated according to the same principle.

According to the prior art, a radial displacement sensor is mounted on the stator, or a displacement sensor-free algorithm is used for detecting and identifying a rotor radial displacement signal and establishing radial displacement closed-loop control, so that stable suspension of the rotor with two degrees of freedom can be implemented.

Figure 9:
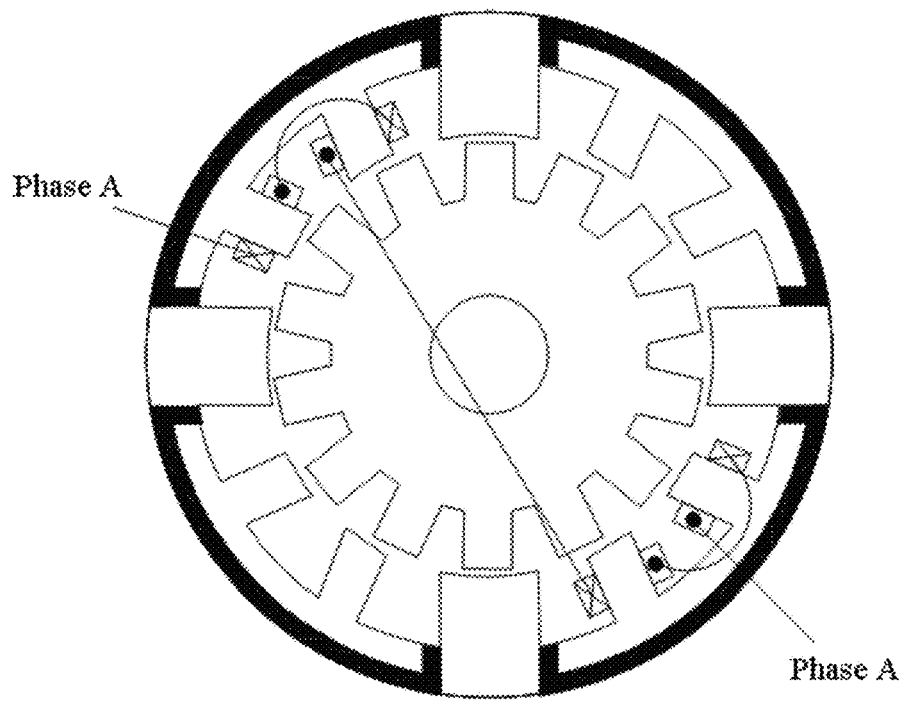
FIG. 9 is a connection diagram of A-phase torque windings of the present invention.
Figure 10:
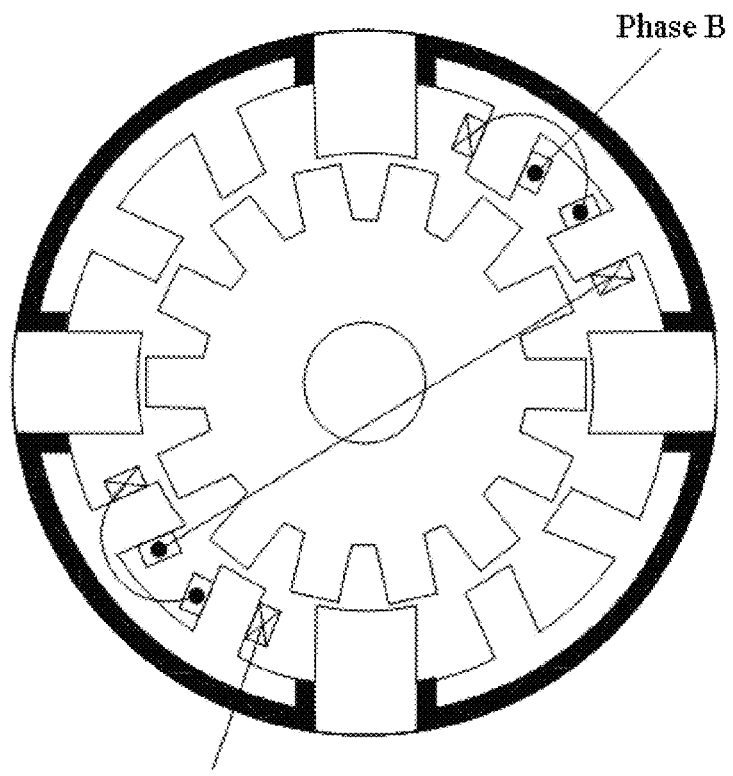
FIG. 10 is a connection diagram of B-phase torque windings of the present invention.

The principle of rotation is: the torque windings 10 on the torque teeth 7 are divided to form a multi-phase structure, and by taking two phases as an example, as shown in FIG. 8 and FIG. 9, phase A and phase B are energized successively, and for the torque winding magnetic field, a closed path is formed between the torque teeth and the rotor teeth, a reluctance force is generated, and torque is generated, thereby implementing the rotation of the rotor.

Such an external winding controlled two-degree-of-freedom bearing-free switched reluctance motor is that the axially magnetized permanent magnet sheets divide the four suspension teeth into left and right parts to establish bias magnetic fluxes, only the torque windings exist on the stator of the motor, and the suspension windings are provided on the control cores on the outer sides. The stator core and the rotor core are made of materials having good axial and radial magnetic conductibility, the permanent magnet sheets are made of rare earth permanent magnets or ferrite permanent magnets having axial magnetization and good magnetic properties, and the suspension windings and the torque windings are all formed by electromagnetic coils having good electric conductivity being wound and then painted and dried.

The invention claimed is:

1. An external winding controlled two-degree-of-freedom bearing-free switched reluctance motor, comprising a stator and a rotor, an edge portion of the rotor being provided with rotor teeth, wherein: the stator consists of an external winding, torque windings, magnetism isolating bodies, torque teeth, suspension teeth, control cores, and a stator core; the stator core comprises four suspension teeth distributed in x and y directions on the same circumference of the radial outer side of the rotor and magnetism isolating bodies connected to two adjacent suspension teeth, each suspension tooth is formed by stacking, along the axial direction of the rotor, a permanent magnet sheet and magnetically conductive sheets symmetrically connected to two sides of the permanent magnet sheet, torque teeth are connected to the inner walls of the magnetism isolating bodies, the suspension teeth and the torque teeth are disposed spaced from the rotor teeth to form a radial working air gap, and torque windings are wound around the torque teeth; the external winding comprises x-direction control cores connecting two suspension teeth in the x direction to form two x-direction symmetrical closed paths, and y-direction control cores connecting two suspension teeth in the y direction to form two y-direction symmetrical closed paths, and suspension windings are respectively wound around the x-direction control cores and the y-direction control cores.

2. The external winding controlled two-degree-of-freedom bearing-free switched reluctance motor according to claim 1, wherein the tooth width of the suspension teeth is greater than that of the torque teeth, and the tooth width of the suspension teeth is greater than one pole pitch of the motor.

3. The external winding controlled two-degree-of-freedom bearing-free switched reluctance motor according to claim 1, wherein the suspension windings and the torque windings are all centralized windings, and the torque windings are divided to form a multi-phase structure.

* * * * *